R. RALSTON.
Machine for Catching Sheep and other Animals.
No. 53,869. Patented April 10, 1866.
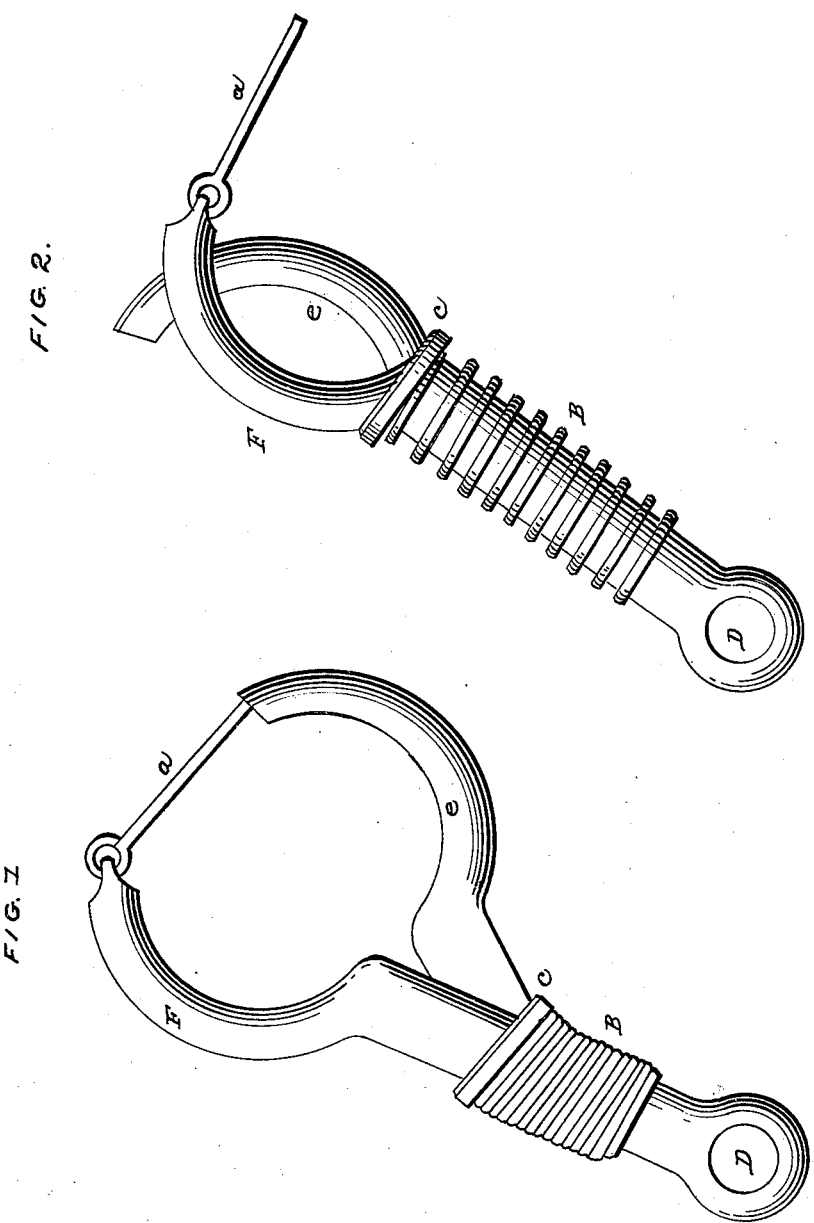

UNITED STATES PATENT OFFICE.

ROBERT RALSTON, OF KALAMAZOO, MICHIGAN.

IMPROVEMENT IN INSTRUMENTS FOR SEIZING AND HOLDING SMALL ANIMALS, AS SHEEP, HOGS, &c.

Specification forming part of Letters Patent No. 53,869, dated April 10, 1866.

To all whom it may concern:

Be it known that I, ROBERT RALSTON, of Kalamazoo, in the county of Kalamazoo and State of Michigan, have invented a new and useful Machine for Catching Sheep, Hogs, and other Animals; and I do hereby declare that the following is a full, clear, and exact description of the construction and operation of the same, reference being had to the annexed drawings, making a part of this specification, in which—

Figure 1 is an open view, and Fig. 2 is a closed view.

In said drawings, letter $a$ is a brace to hold the jaws F and $e$ distended while being fastened on the leg. $c$ is a ring to hold the jaws together while fast on the leg. B is a spiral spring, holding or pressing ring $c$ upon the jaws F and $e$, and D is an eye in which to fasten or attach a cord and staff. E is a pivot or pin on which the jaws play.

I make the jaws of brass or malleable iron, or any other suitable metal, and give each the desired shape, as shown in the drawings. About one-third of the way up from the eye D the pin or pivot is placed, on which the jaws swing. On the lower end of jaw F the eye D is made. The spring is made of brass or steel wire, and is of sufficient tension to force ring $c$ upon jaws F $e$ and hold it the reany desired length of time. Ring $c$ is made of any suitable metal, and serves to hold the jaws together while fast on the leg of the animal.

Operation: I fasten a cord, rope, or chain and pole or staff at eye D on jaw F. I then compress the spring until the jaws will open freely; then fix the brace $a$ between the points of the jaws; then, by suddenly thrusting the machine forward until the brace strikes the leg of the animal, which knocks the brace from between the jaws, letting them close upon the leg.

I do not claim any individual part of the machine as described; but

What I do claim as my invention is—

1. The jaws being held distended by the brace, or its equivalent, preparatory to its being fastened upon the leg.

2. The points of the jaws passing each other, thus allowing them to fit closely to the leg of a small or large animal.

3. The combination and arrangement of the machine, substantially as and for the purposes set forth.

ROBERT RALSTON.

Witnesses:
JAMES A. WALTER,
O. O. JENNINGS.